United States Patent
Lin et al.

(10) Patent No.: US 11,695,953 B2
(45) Date of Patent: Jul. 4, 2023

(54) METHOD AND APPARATUS OF CONSTRAINED OVERLAPPED BLOCK MOTION COMPENSATION IN VIDEO CODING

(71) Applicant: MEDIATEK INC., Hsinchu (TW)

(72) Inventors: Zhi-Yi Lin, Hsinchu (TW); Tzu-Der Chuang, Hsinchu (TW); Ching-Yeh Chen, Hsinchu (TW); Chun-Chia Chen, Hsinchu (TW); Chih-Wei Hsu, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 17/326,421

(22) Filed: May 21, 2021

(65) Prior Publication Data

US 2021/0274218 A1     Sep. 2, 2021

Related U.S. Application Data

(63) Continuation of application No. 16/507,403, filed on Jul. 10, 2019, now Pat. No. 11,051,036.

(60) Provisional application No. 62/779,559, filed on Dec. 14, 2018, provisional application No. 62/770,228, filed on Nov. 21, 2018, provisional application No. 62/757,246, filed on Nov. 8, 2018, provisional application No. 62/744,687, filed on Oct. 12, 2018, provisional application No. 62/744,120, filed on Oct. 10, 2018, provisional application No. 62/732,021, filed on Sep. 17, 2018, provisional application No. 62/698,116, filed on Jul. 14, 2018.

(51) Int. Cl.
*H04N 19/577* (2014.01)
*H04N 19/70* (2014.01)

(52) U.S. Cl.
CPC .......... *H04N 19/577* (2014.11); *H04N 19/70* (2014.11)

(58) Field of Classification Search
CPC ............................ H04N 19/577; H04N 19/70
See application file for complete search history.

(56) References Cited

U.S. PATENT DOCUMENTS

| 2013/0128974 A1 | 5/2013 | Chien et al. |
| 2016/0219302 A1* | 7/2016 | Liu ...................... H04N 19/583 |
| 2016/0330475 A1 | 11/2016 | Zhou |
| 2018/0098086 A1* | 4/2018 | Chuang ................ H04N 19/625 |

(Continued)

OTHER PUBLICATIONS

Chinese language office action dated Jul. 9, 2020, issued in application No. TW 108124469.

*Primary Examiner* — Jae N Noh
(74) *Attorney, Agent, or Firm* — McClure, Qualey & Rodack, LLP

(57) ABSTRACT

A method and apparatus use an Inter coding tool and OBMC (Overlapped Block Motion Compensation). According to one implementation, a method of video coding using OBMC (Overlapped Block Motion Compensation) operates by receiving input data associated with a current block, wherein the input data correspond to pixel data to be coded at an encoder side or coded data to be decoded at a decoder side, applying the OBMC to the current block depending on one or more constraints, and signaling an OBMC syntax conditionally at the encoder side or parsing the OBMC syntax conditionally at the decoder side for the current block, wherein the OBMC syntax indicates whether the OBMC is applied to the current block.

18 Claims, 6 Drawing Sheets

(56) References Cited

U.S. PATENT DOCUMENTS

| | | |
|---|---|---|
| 2019/0191171 A1* | 6/2019 | Ikai .................... H04N 19/117 |
| 2019/0268594 A1 | 8/2019 | Lim et al. |
| 2019/0320203 A1* | 10/2019 | Chiang ............... H04N 19/521 |
| 2020/0288168 A1 | 9/2020 | Zhang et al. |

* cited by examiner

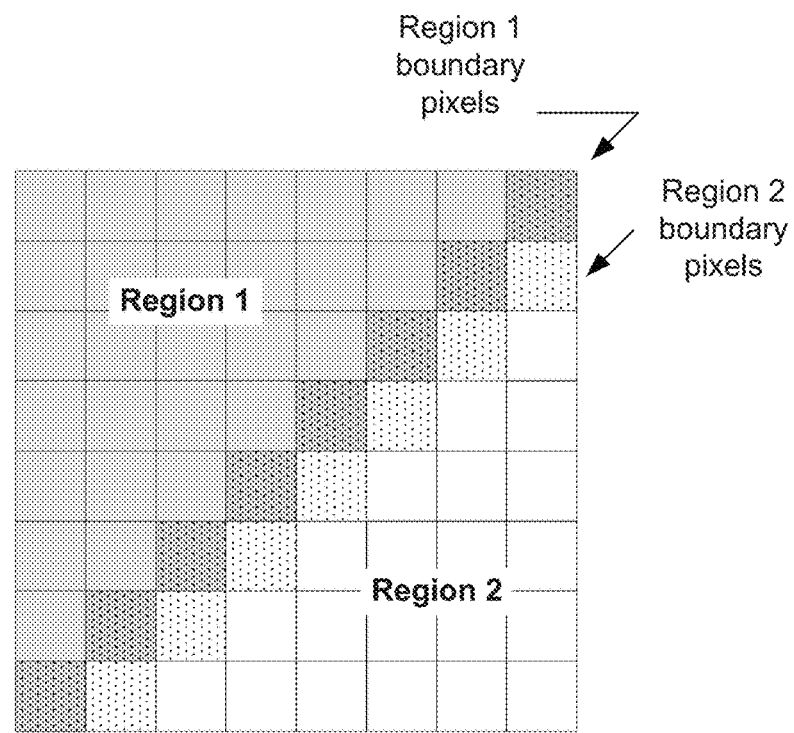
*Fig. 1*
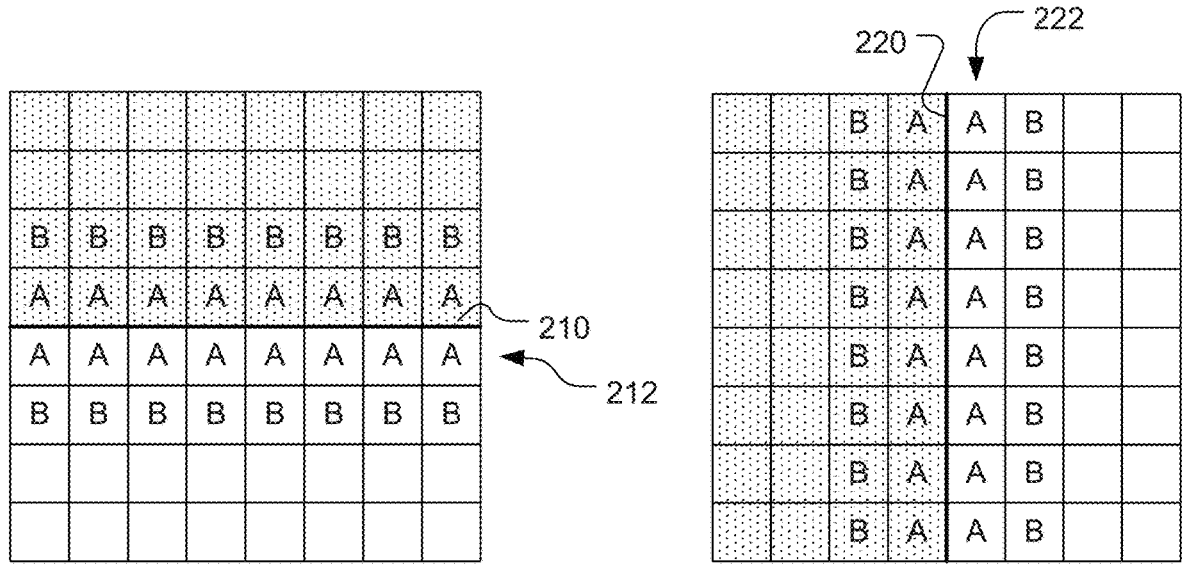
*Fig. 2A*   *Fig. 2B*

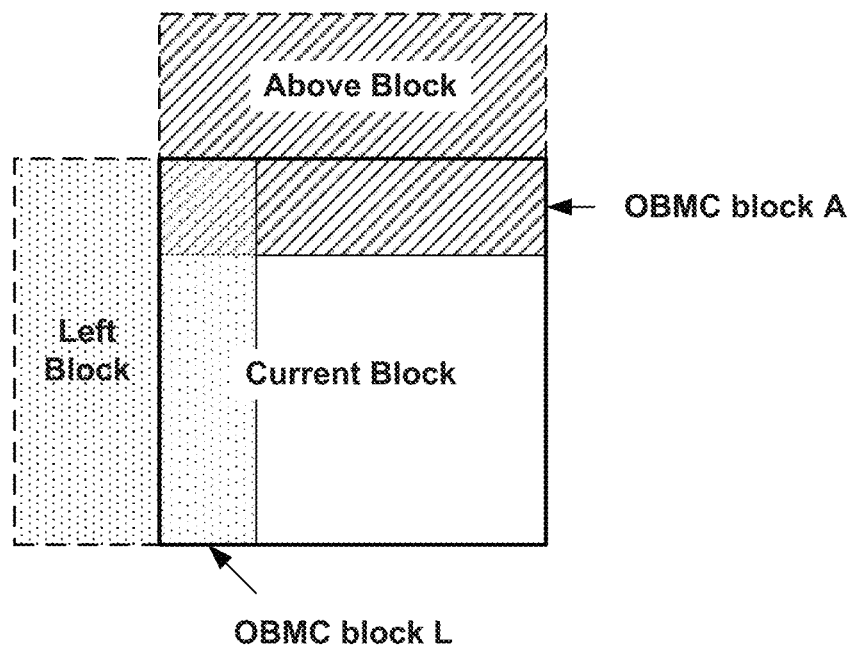
*Fig. 4*
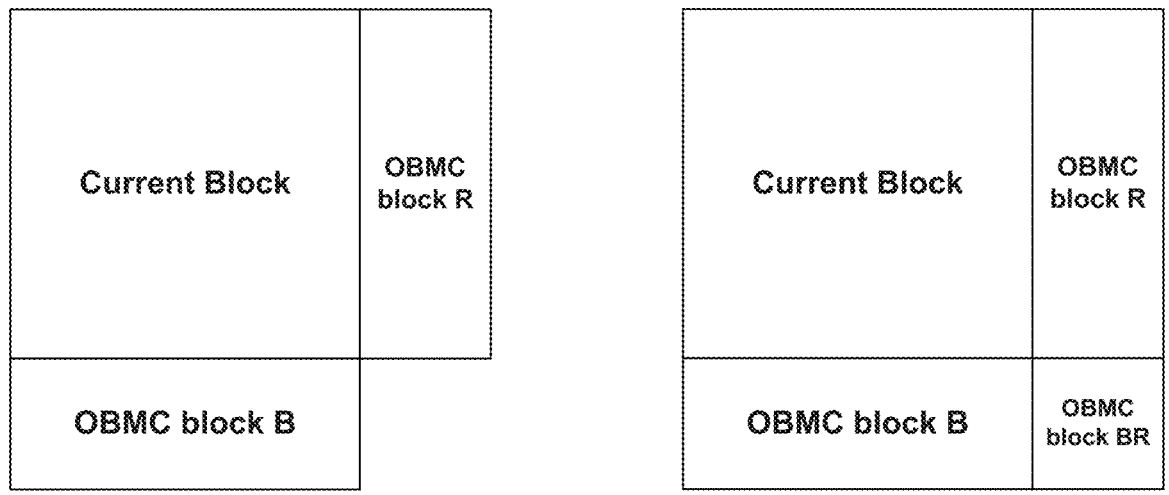
*Fig. 5A*  *Fig. 5B*

METHOD AND APPARATUS OF CONSTRAINED OVERLAPPED BLOCK MOTION COMPENSATION IN VIDEO CODING

CROSS REFERENCE TO RELATED APPLICATIONS

The present invention is a Continuation of pending U.S. patent application Ser. No. 16/507,403, filed Jul. 10, 2019, which claims priority to U.S. Provisional Patent Application Ser. No. 62/698,116, filed on Jul. 14, 2018, U.S. Provisional Patent Application Ser. No. 62/732,021, filed on Sep. 17, 2018, U.S. Provisional Patent Application Ser. No. 62/744,120, filed on Oct. 10, 2018, U.S. Provisional Patent Application Ser. No. 62/744,687, filed on Oct. 12, 2018, U.S. Provisional Patent Application Ser. No. 62/757,246, filed on Nov. 8, 2018, U.S. Provisional Patent Application Ser. No. 62/770,228, filed on Nov. 21, 2018 and U.S. Provisional Patent Application Ser. No. 62/779,559, filed on Dec. 14, 2018. The U.S. Patent Applications are hereby incorporated by reference in their entireties.

FIELD OF THE INVENTION

The present invention relates to overlapped block motion compensation for a video coding system. In particular, the present invention relates applying constraints to overlapped block motion compensation in order to reduce bandwidth and/or complexity.

BACKGROUND AND RELATED ART

The High Efficiency Video Coding (HEVC) standard is developed under the joint video project of the ITU-T Video Coding Experts Group (VCEG) and the ISO/IEC Moving Picture Experts Group (MPEG) standardization organizations, and is especially with partnership known as the Joint Collaborative Team on Video Coding (JCT-VC). In HEVC, one slice is partitioned into multiple coding tree units (CTU). In main profile, the minimum and the maximum sizes of CTU are specified by the syntax elements in the sequence parameter set (SPS). The allowed CTU size can be 8×8, 16×16, 32×32, or 64×64. For each slice, the CTUs within the slice are processed according to a raster scan order.

Overlapped Block Motion Compensation (OBMC) is a technique to reduce artifacts that are more prominent at block boundaries. The OBMC is based on finding a Linear Minimum Mean Squared Error (LMMSE) estimation of pixel intensity values using motion-compensated signals derived from motion vectors (MVs) of nearby blocks. From estimation-theoretic perspective, these MVs are regarded as different plausible hypotheses for its true motion. In order to maximize coding efficiency, their weights are derived to minimize the mean squared prediction error subject to the unit-gain constraint.

When High Efficient Video Coding (HEVC) was developed, some OBMC related techniques have been proposed as a coding tool to improve coding gain. Some of them are described as follows.

In JCTVC-C251 (P. Chen, et al., *Overlapped block motion compensation in TMuC*, Joint Collaborative Team on Video Coding (JCT-VC) of ITU-T SG 16 WP 3 and ISO/IEC JTC 1/SC 29/WG 11, 3rd Meeting: Guangzhou, CN, 7-15 Oct. 2010, Document: JCTVC-C251), OBMC was applied to geometry partition. In geometry partition, it is very likely that a transform block contains pixels belonging to different partitions. In geometry partition, since two different motion vectors are used for motion compensation, the pixels at the partition boundary may have large discontinuities that can produce visual artifacts that are prominent at block boundaries. This in turn decreases the transform efficiency. Let the two regions created by a geometry partition be denoted by region 1 and region 2. A pixel from region 1 (2) is defined to be a boundary pixel if any of its four connected neighbors (left, top, right, and bottom) belongs to region 2 (1). FIG. 1 shows an example where grey-shaded pixels belong to the boundary of region 1 (grey region) and white-shade pixels belong to the boundary of region 2 (white region). If a pixel is a boundary pixel, the motion compensation is performed using a weighted sum of the motion predictions from the two motion vectors. The weights are ¾ for the prediction using the motion vector of the region containing the boundary pixel and ¼ for the prediction using the motion vector of the other region. The overlapping boundaries improve the visual quality of the reconstructed video while also providing BD-rate gain.

In JCTVC-F299 (L. Guo, et al., *CE2:Overlapped Block Motion Compensation for 2N×N and N×2N Motion Partitions*, Joint Collaborative Team on Video Coding (JCT-VC) of ITU-T SG 16 WP 3 and ISO/IEC JTC 1/SC 29/WG 11, 6th Meeting: Torino, 14-22 Jul. 2011, Document: JCTVC-F299), OBMC is applied to symmetrical motion partitions. If a coding unit (CU) is partitioned into two 2N×N or N×2N prediction units (PUs), OBMC is applied to the horizontal boundary of the two 2N×N prediction blocks, and to the vertical boundary of the two N×2N prediction blocks. Since those partitions may have different motion vectors, the pixels at partition boundaries may have large discontinuities, which may cause visual artefacts and also reduce the transform/coding efficiency. In JCTVC-F299, OBMC is introduced to smooth the boundaries of motion partition.

FIG. 2A illustrates an example of OBMC for 2N×N partition and FIG. 2B illustrates an example of OBMC for N×2N partition. The dots-filled pixels represent pixels belonging to Partition 0 and blank pixels represent pixels belonging to Partition 1. The overlapped region in the luma component is defined as two rows or two columns of pixels on each side of the horizontal or vertical boundary respectively. For a pixel row or column (i.e., pixels labelled as A in FIG. 2A and FIG. 2B) that is adjacent to the partition boundary (210 or 220), OBMC weighting factors are (¾, ¼). In other words, for pixels A in row 212 of Partition 1, MC (motion compensated) pixel $A_1$ is generated based on MV1 of Partition 1 and MC pixel $A_0$ is generated based on MV0 of Partition 0. The OBMC processed pixel A is derived according to (¾ $A_1$+¼ $A_0$). Similar derivation applies to OBMC pixels in column 222. For pixels (i.e., pixels labelled as B in FIG. 2A and FIG. 2B) that are two rows or columns away from the partition boundary, OBMC weighting factors are (⅞, ⅛). For chroma components, the overlapped region is defined as one row or one column of pixels on each side of the horizontal or vertical boundary respectively, and the weighting factors are (¾, ¼).

As is known in the video coding field, BIO is motion estimation/compensation technique disclosed in JCTVC-C204 (E. Alshina, et al., *Bi-directional optical flow*, Joint Collaborative Team on Video Coding (JCT-VC) of ITU-T SG 16 WP 3 and ISO/IEC JTC 1/SC 29/WG 11, 3rd Meeting: Guangzhou, CN, 7-15 Oct. 2010, Document: JCTVC-C204) and VCEG-AZ05 (E. Alshina, et al., *Known tools performance investigation for next generation video coding*, ITU-T SG 16 Question 6, Video Coding Experts Group (VCEG), 52$^{nd}$ Meeting: 19-26 Jun. 2015, Warsaw, Poland, Document: VCEG-AZ05). BIO derived the sample-level motion refinement based on the assumptions of optical flow and steady motion, where a current pixel in a B-slice (bi-prediction slice) is predicted by one pixel in reference picture 0 and one pixel in reference picture 1.

Currently, the MC results for the overlapped region between two CUs or PUs are generated by another MC process after the normal MC process for current CU or PU. Therefore, BIO (Bi-directional Optical flow) is applied twice in these two MC process to refine these two MC results, respectively. When two neighboring MVs are the same, the above processing order can help to skip the redundant OBMC and BIO processes. However, the required bandwidth and MC operations for the overlapped region is increased compared to integrated OBMC process and normal MC process. For example, the current PU size is 16×8, the overlapped region is 16×2, and the interpolation filter in MC is 8-tap. If the OBMC is performed after normal MC, (16+7)×(8+7)+(16+7)×(2+7)=552 reference pixels per reference list for current PU and the related OBMC will be required. If the OBMC operations are integrated with the normal MC, only (16+7)×(8+2+7)=391 reference pixels per reference list will be required for the current PU and the related OBMC. Therefore, it is desirable to reduce the computational complexity or memory bandwidth of BIO when BIO and OBMC are enabled simultaneously.

In JEM (Joint Exploration Model) being developed by Joint Video Exploration Team (WET) of ITU-T VCEG and ISO/IEC MPEG, the OBMC is also applied. In the JEM, unlike in H.263, OBMC can be switched on and off using syntax at the CU level. When OBMC is used in the JEM, the OBMC is performed for all motion compensation (MC) block boundaries except for the right and bottom boundaries of a CU. Moreover, it is applied for both the luma and chroma components. In the JEM, an MC block corresponds to a coding block. When a CU is coded with sub-CU mode (includes sub-CU Merge, affine and FRUC mode), each sub-block of the CU is a MC block. To process CU boundaries in a uniform fashion, OBMC is performed at sub-block level for all MC block boundaries, where sub-block size is set equal to 4×4, as shown in FIGS. 3A and 3B. FIG. 3A illustrates OBMC for sub-blocks at CU (coding unit) or PU (prediction unit) boundary. The sub-blocks filled with dots (310) correspond to sub-blocks where the OBMC to be applied. The motion vector(s) of neighboring block(s) and the motion vector of the current sub-block are used to derive the OBMC predictor. For sub-block $P_{N1}$ (320), the motion vector of the above sub-block (322) is used for the OBMC operation. For sub-block $P_{N2}$ (330), the motion vector of the left sub-block (332) is used for the OBMC operation. For sub-block $P_{N3}$ (340), the motion vectors of the above sub-block (342) and the left sub-block (344) are used for the OBMC operation. FIG. 3B illustrates OBMC for sub-PU in the ATMVP (Advanced Temporal Motion Vector Prediction) mode. The ATMVP mode is also referred as Sub-PU Temporal Motion Vector Prediction (Sub-PU TMVP) mode, which is a coding tool improve the coding efficiency. A sub-PU TMVP can be used as a Merge candidate for Merge mode. For the ATMVP mode, when OBMC is applied to the current sub-block (350), besides current motion vectors, motion vectors of four connected neighboring sub-blocks (352-358) if available and are not identical to the current motion vector, are also used to derive the prediction block for the current sub-block. These multiple prediction blocks based on multiple motion vectors are combined to generate the final prediction signal of the current sub-block.

Prediction block based on motion vectors of a neighboring sub-block is denoted as PN, with N indicating an index for the neighboring above, below, left and right sub-blocks and prediction block based on motion vectors of the current sub-block is denoted as PC. When PN is based on the motion information of a neighboring sub-block that contains the same motion information to the current sub-block, the OBMC is not performed from PN. Otherwise, every sample of PN is added to the same sample in PC, i.e., four rows/columns of PN are added to PC. The weighting factors {¼, ⅛, 1/16, 1/32} are used for PN and the weighting factors {¾, ⅞, 15/16, 31/32} are used for PC. The exception are small MC blocks (i.e., when height or width of the coding block equal to 4 or a CU coded with sub-CU mode) where only two rows/columns of PN are added to PC. In this case weighting factors {¼, ⅛} are used for PN and weighting factors {¾, ⅞} are used for PC. For PN generated based on motion vectors of vertically (horizontally) neighboring sub-block, samples in the same row (column) of PN are added to PC with a same weighting factor.

In the JEM, for a CU with size less than or equal to 256 luma samples, a CU level flag is signaled to indicate whether OBMC is applied or not for the current CU. For the CUs with size larger than 256 luma samples or not coded with AMVP mode, OBMC is applied by default. At the encoder, when OBMC is applied for a CU, its impact is taken into account during the motion estimation stage. The prediction signal formed by OBMC using motion information of the top neighboring block and the left neighboring block is used to compensate the top and left boundaries of the original signal of the current CU, and then the normal motion estimation process is applied.

In JEM, the OBMC is applied. For example, as shown in FIG. 4, for a current block, if the above block and the left block are coded in Inter mode, it uses the MV of the above block to generate an OBMC block A and uses the MV of the left block to generate an OBMC block L. the predictors of OBMC block A and OBMC block L are blended with the current predictors. To reduce the memory bandwidth of OBMC, the above 4-row MC and left 4 column MC can be done with the neighboring blocks. For example, when doing the above block MC, 4 additional rows are fetched to generate a block of (above block+OBMC block A). The predictors of OBMC block A are stored in a buffer for coding the current block. When doing the left block MC, 4 additional column are fetched to generate a block of (left block+OBMC block L). The predictors of OBMC block L are stored in a buffer for coding the current block. Therefore, when doing the MC of current, four additional rows and four additional columns of reference pixels are fetched to generate the predictors of current block, the OBMC block-B, and the OBMC block-R. The locations of the OBMC block-B and the OBMC block-R are shown in FIG. 5A. In some embodiments, the OBMC block BR is also generated as shown in FIG. 5B. The OBMC block-B and the OBMC block-R are stored in buffers for the OBMC process of the bottom neighboring blocks and the right neighboring blocks.

For an M×N block, if the MV is not integer MC and a L-tap interpolation filter is applied, a reference block with size of (M+7)×(N+7) is used for motion compensation. However, if the BIO and OBMC is applied, additional reference pixels are required, which increases the worst case memory bandwidth.

According to the present practice for OBMC with bi-prediction, the motion compensation (MC) process is performed the twice (during the original MC process and the OBMC stage). The process not only requires more computations, but also requires more memory access for the reference data. Besides bi-prediction, there are many other Inter prediction related coding tools for improving coding performance. Usually, these coding tools require additional data access that results in higher system bandwidth. In additional, these coding tools may require more operations and increase system complexity. It is desirable to develop techniques to reduce the require computations or system bandwidth for OBMC with BIO or other coding tools.

BRIEF SUMMARY OF THE INVENTION

Method and apparatus of using an Inter coding tool and OBMC (Overlapped Block Motion Compensation) are disclosed. According to one method of the present invention, input data associated with a current block are received, where the input data correspond to pixel data to be coded at an encoder side or coded data to be decoded at a decoder side. The prediction direction of the current block and a neighboring block are then determined, where the neighboring block is encoded or decoded prior to the current block and the prediction direction comprises uni-prediction and bi-prediction. When the current block, the neighboring block or both are bi-prediction coded: a first predictor and a second predictor for a target boundary area in a current reference block are determined. A combined predictor is generated using a weighted sum of the first predictor and the second predictor. An overlapped-boundary predictor comprising the combined predictor is used to encode or decode the current block. The first predictor is determined using a uni-prediction mode based on first motion information of the current block, where the current reference block is determined according to a first location of the current block and the first motion information of the current block. The second predictor is determined using the uni-prediction mode based on second motion information of the neighboring block, where the target boundary area is adjacent to a block boundary between the current reference block and a neighboring reference block, and the neighboring reference block is determined according to a second location of the neighboring block and the second motion information of the neighboring block.

In one embodiment, the second predictor for the target boundary area is derived using the uni-prediction mode by treating the neighboring block as uni-prediction coded during OBMC derivation when the current block is uni-prediction coded and the neighboring block is bi-prediction coded. For example, third motion information associated with the second predictor in the uni-prediction mode is derived from the second motion information of the neighboring block.

In one embodiment, when the neighboring block is bi-prediction coded, the neighboring block is treated as uni-prediction coded by selecting a target predictor from two predictors associated with the neighboring block, where the target predictor is derived from a target reference picture having a smaller POC (Picture Order Count) difference to a current picture containing the current block. In another embodiment, the target predictor is derived from a target reference picture having a larger POC (Picture Order Count) difference to a current picture containing the current block. In yet another embodiment, the target predictor is assigned a larger weight for bi-prediction with different weights. In yet another embodiment, the target predictor is derived from a target reference picture having a smaller reference picture index. In yet another embodiment, the target predictor is derived from a target reference picture having a larger reference picture index. In yet another embodiment, the target predictor is derived using a candidate list containing a target motion vector more similar to a current motion vector of the current block. In yet another embodiment, the target predictor is derived using a candidate list containing a target motion vector less similar to a current motion vector of the current block.

The current block corresponds to a coding unit (CU) or a sub-CU.

According to another method of the present invention, the OBMC is applied to the current block depending on one or more constrains. An OBMC syntax is signaled conditionally at the encoder side or the OBMC syntax is parsed conditionally at the decoder side for the current block, where the OBMC syntax indicates whether the OBMC is applied to the current block.

In one embodiment, the constraints correspond to the OBMC being applied to a target block when the target block is uni-prediction coded, and the OBMC syntax is not signaled for the current block if the current block is bi-prediction coded. In another embodiment, the constraints correspond to the OBMC being applied to a target block for Inter mode when the target block is uni-prediction coded, and the OBMC syntax is not signaled for the current block if the current block is bi-prediction coded.

BRIEF DESCRIPTION OF THE DRAWINGS

FIG. 1 illustrates an example of Bi-directional Optical Flow (BIO) to derive offset motion vector for motion refinement.

FIG. 2A illustrates an example of OBMC for 2N×N partition.

FIG. 2B illustrates an example of OBMC for N×2N partition.

FIG. 4 illustrates an example of OBMC, where if the above block and the left block are coded in Inter mode, the OBMC uses the MV of the above block to generate an OBMC block A and uses the MV of the left block to generate an OBMC block L.

FIG. 5A illustrates an example of an OBMC block at the bottom (B) and an OBMC block to the right (R).

FIG. 5B illustrates an example of an additional OBMC block at the bottom-right (BR).

DETAILED DESCRIPTION OF THE INVENTION

Figure 3A:
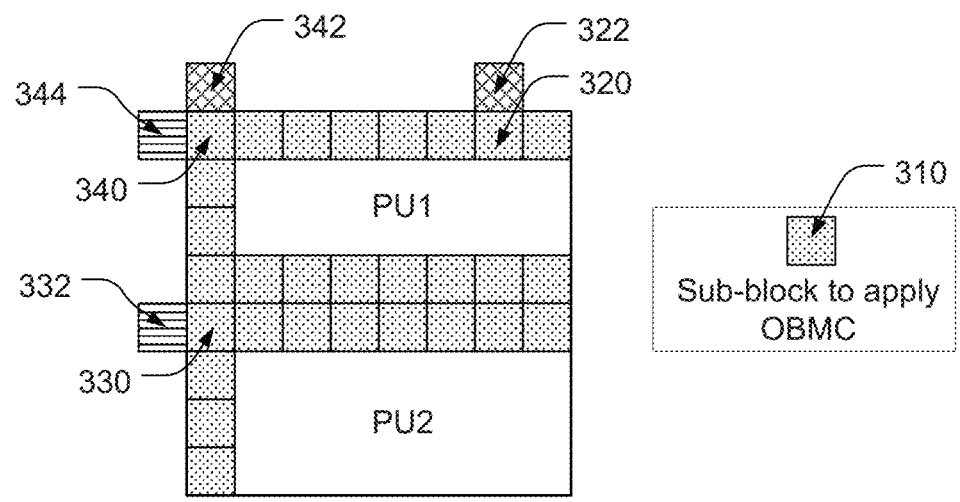
FIG. 3A illustrates OBMC for sub-blocks at CU (coding unit) or PU (prediction unit) boundary, where the sub-blocks filled with dots correspond to sub-blocks where the OBMC to be applied.
Figure 3B:
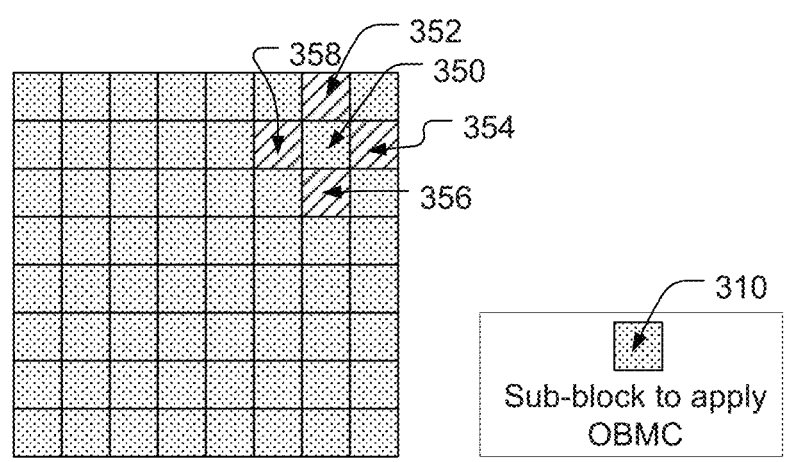
FIG. 3B illustrates OBMC for sub-PU in the ATMVP (Advanced Temporal Motion Vector Prediction) mode, where a sub-PU TMVP can be used as a Merge candidate for Merge mode.

The following description is of the best-contemplated mode of carrying out the invention. This description is made for the purpose of illustrating the general principles of the invention and should not be taken in a limiting sense. The scope of the invention is best determined by reference to the appended claims.

As mentioned before, OBMC can improve coding efficiency. However, OBMC will increase system bandwidth since additional neighboring samples have to be fetched for deriving the OBMC predictor. Also, the OBMC will also increase system complexity due to additional operations related to OBMC. When OBMC is used with other coding tools such BIO, the system bandwidth and complexity issues become worse. Various techniques to reduce the system bandwidth and/or system complexity are disclosed in the present invention.

In one embodiment, whether OBMC is applied to a current block is decided according to information of the current block or information of neighboring blocks.

In one example, the OBMC is derived from OBMC block A and OBMC block L using the MVs of neighboring blocks and then blending predictors of current block with the two generated OBMC blocks as shown in FIG. 4. Whether to apply OBMC can be decided according to information of one or more neighboring blocks. The information can be any characteristics of the neighboring block, such as the size, shape, width, height, both width and height, Inter direction (i.e. uni-prediction or bi-prediction), or MV difference (i.e., the difference between a neighboring MV and the current MV) of the current block, or any combination of the above characteristics. In one embodiment, if the size of reference block is less than a predefined value, (e.g. 64), then OBMC will not be applied to regions (also called areas in this disclosure) referencing this block. In another embodiment, if the width or height of the reference block is less than a predefined value, (e.g. 8), then OBMC will not be applied to regions or areas referencing this block. In another embodiment, if the Intra direction of the reference block is bi-prediction, then OBMC will not be applied to regions using this block. In another embodiment, if the MV difference between reference MV and current MV is less than a predefined value, then OBMC will not be applied to blocks using this block. In another embodiment, if the size of the reference block is less than a predefined value (e.g. 64) and the reference block is bi-prediction coded, then OBMC will not be applied to regions referencing this block.

In another example, OBMC is derived from OBMC block R and OBMC block B using the MV current block and then storing the results into line buffers for other blocks as shown in FIG. 5. Whether to apply OBMC can be decided according to information of the current block. The information can be any characteristics of current block, such as the size, shape, width, height, both width and height, Inter direction (i.e. uni-prediction or bi-prediction), or any combination of the above characteristics. In one embodiment, if the size of current block is less than a predefined value (e.g. 64), then OBMC will not be applied to this block. In another embodiment, if the width or height of the current block is less than a predefined value (e.g. 8), then OBMC will not be applied to this block. In another embodiment, if Inter direction of the current block is bi-prediction, then OBMC will not be applied to this block. In another embodiment, if the size of the current block is less than a predefined value (e.g. 64) it is bi-prediction, then OBMC will not be applied to this block.

The benefits of restricting OBMC to small blocks are apparent from the following discussion. For an 8×8 block, the MC (motion compensation) requires horizontal 8-tap interpolation filtering for (8+7) rows, and vertical 8-tap interpolation filtering for 8 columns. If OBMC is applied and the OBMC width and OBMC height are equal to 4, the MC will require horizontal 8-tap interpolation filtering for (8+7+4) rows, and vertical 8-tap interpolation filtering for (8+4) columns. Therefore, OBMC will result in 34.8% more numbers of 8-tap interpolation filtering compared to MC without OBMC. As the block size becomes larger (e.g. 16×16), after applying OBMC, there will be 20.5% more of 8-tap interpolation filtering compared to MC without OBMC. When the block size is equal to 32×32, the additional numbers of 8-tap interpolation filtering becomes 11.2% compared to MC without OBMC. It can be observed that the numbers of additional interpolation filtering decrease as the size of current block increases. Therefore, restricting OBMC to blocks with small size (e.g. 8×8) can effectively reduce the OBMC complexity.

In another method of the present invention, the OBMC is constrained according to the width, height, size, shape, or channel type (i.e., luma or chroma) of current block.

In one embodiment, OBMC is always turned on for every block. Therefore, there is no additional syntax required by OBMC. In another embodiment, OBMC is turned off if the width of current block is less than a predefined threshold. For example, OBMC is turned off if the width of the current block is less than 16. In another embodiment, OBMC is turned off if the width of the current block is larger than a predefined threshold. For example, OBMC is turned off if the width of the current block is larger than 32. In another embodiment, OBMC is turned off if the height of the current block is less than a predefined threshold. For example, OBMC is turned off if the height of the current block is less than 16. In another embodiment, OBMC is turned off if the height of current block is larger than a predefined threshold. For example, OBMC is turned off if the height of the current block is larger than 32. In another embodiment, OBMC is turned off if the size of current block is less than a predefined threshold. For example, OBMC is turned off is current block' size is less than 64. In another embodiment, OBMC is turned off if the size of current block is larger than a predefined threshold. For example, OBMC is turned off if the size of the current block is larger than 1024. In another embodiment, OBMC is turned off if the size of current block is less than a predefined threshold A or larger than a predefined threshold B. For example, OBMC is turned off if the size of the current block is less than 64 or larger than 1024.

In another embodiment, OBMC is turned off if the current block is rectangular and the width is larger than M*height, where M is a predefined value. For example, OBMC is turned off if current block is rectangular and the width is larger than 2*height, where M is a predefined value. In another embodiment, OBMC is turned off if the current block is rectangular and the height is larger than M*width, where M is a predefined value. For example, OBMC is turned off if current block is rectangular and the height is larger than 2*width, where M is a predefined value.

In another embodiment, OBMC is turned off for the chroma component in each block. In another embodiment, OBMC is turned off according to a combination of the above embodiments. For example, if the width is less than 16 or height is less than 16, OBMC is turned off. In another example, if the size is larger than 1024 and the width is larger than 2*height, OBMC is turned off. In another example, if the size is larger than 1024 and the height is larger than 2*width, OBMC is turned off. In another example, if the width is larger than 32 and the width is larger than 2*height, OBMC is turned off. In another example, if the height is larger than 32 and the height is larger than 2*width, OBMC is turned off. In another example, if the size is less than 32 and is chroma type, OBMC is turned off.

OBMC with High Level Syntax

In one aspect of the present invention, high-level syntax related to constraining OBMC is disclosed. It is proposed to add a sequence-level (e.g. SPS (sequence parameter set) flag) or picture-level (e.g. PPS (picture parameter set) flag) for OBMC. If the SPS/PPS flag for OBMC is true, OBMC will be determined in the CU level using another syntax or the OBMC is enabled if said another syntax in the CU level is not signaled. If the SPS/PPS flag for OBMC is not true, OBMC is applied to all blocks predicted by Inter prediction mode or disabled (disabled for all inter blocks). A syntax can be add in slice-level or tile-level. The syntax can overwrite the flag in SPS/PPS.

OBMC with Constraints

As mentioned earlier, the memory bandwidth issue associated with OBMC gets worse for the smaller blocks. The issue gets even worse for bi-prediction coded blocks. In order to reduce the bandwidth as well as to reduce the computational complexity, several methods are disclosed as follows.

In one embodiment, OBMC is applied with different number of blended lines according to the size, width, height, one or more motion information of the current block, or any combination of the above. The motion information includes the MV, Inter direction (inter_dir), reference picture list, reference picture index, picture order count of reference picture, or any combination of the above.

In one embodiment, if the size of the current block is less than a predefined value, OBMC will not be applied. The size can be 16, 32, 64, 128, or 256. In one embodiment, if the height and/or width of current block is less than a predefined value, OBMC will not be applied. The value can be 4, 8, 16, 32, 64, or 128.

In one embodiment, if the width and/or height of current block is larger than a predefined value_A, OBMC will be applied, and if the width and/or height of current block is larger than a predefined value_B, it will only generate OBMC blocks using uni-prediction. Otherwise, OBMC will not be applied. The value_A and value_B can be 2, 4, 8, 16, 32, or 64. The combination of value_A and value_B (i.e., (value_A, value_B)) can be (64, 32), (64, 16), (64, 8), (64, 4), (64, 2), (32, 16), (32, 8), (32, 4), (32, 2), (16, 8), (16, 4), (16, 2), (8, 4), (8, 2) and (4, 2).

In one embodiment, if the size of current block is larger than a predefined value_A, OBMC will be applied and if the size of current block is larger than a predefined value_B, it will only generate OBMC blocks using uni-prediction. Otherwise, OBMC will not be applied. The value_A and value_B can be 4, 8, 16, 32, 64, 128, 256, 512, 1024, 2048, 4096, and 8192. The combination of value_A and value_B (i.e., (value_A, value_B)) can be (8192, 4096), (8192, 2048), (8192, 1024), (8192, 512), (8192, 256), (8192, 128), (8192, 64), (8192, 32), (8192, 16), (8192, 8), (8192, 4), (4096, 2048), (4096, 1024), (4096, 512), (4096, 256), (4096, 128), (4096, 64), (4096, 32), (4096, 16), (4096, 8), (4096, 4), (2048, 1024), (2048, 512), (2048, 256), (2048, 128), (2048, 64), (2048, 32), (2048, 16), (2048, 8), (2048, 4), (1024, 512), (1024, 256), (1024, 128), (1024, 64), (1024, 32), (1024, 16), (1024, 8), (1024, 4), (512, 256), (512, 128), (512, 64), (512, 32), (512, 16), (512, 8), (512, 4), (256, 128), (256, 64), (256, 32), (256, 16), (256, 8), (256, 4), (128, 64), (128, 32), (128, 16), (128, 8), (128, 4), (64, 32), (64, 16), (64, 8), (64, 4), (32, 16), (32, 8), (32, 4), (16, 8), (16, 4), and (8, 4).

In another embodiment, OBMC is applied with a different number of blended lines according to the size, width, height, one or more motion information of the neighboring block, or any combination of the above. The motion information includes the MV, Inter direction (inter_dir), reference picture list, reference picture index, picture order count of the reference picture, or any combination of the above.

In one embodiment, if the size of neighboring block is less than a predefined value, OBMC will not be applied. The size can be 16, 32, 64, 128, or 256. In another embodiment, if the height and/or width of neighboring block is less than a predefined value, OBMC will not be applied. The value can be 4, 8, 16, 32, 64, or 128.

In one embodiment, if the width and/or height of neighboring block is larger than a predefined value_A, OBMC will be applied and if the width and/or height of neighboring block is larger than a predefined value_B, it will only generate OBMC blocks using uni-prediction. Otherwise, OBMC will not be applied. The value_A and value_B can be 2, 4, 8, 16, 32, or 64. The combination of value_A and value_B (i.e., (value_A, value_B)) can be (64, 32), (64, 16), (64, 8), (64, 4), (64, 2), (32, 16), (32, 8), (32, 4), (32, 2), (16, 8), (16, 4), (16, 2), (8, 4), (8, 2) and (4, 2).

In one embodiment, if the size of neighboring block is larger than a predefined value_A, OBMC will be applied and if the size of neighboring block is larger than a predefined value_B, it will only generate OBMC blocks using uni-prediction. Otherwise, OBMC will not be applied. The value_A and value_B can be 4, 8, 16, 32, 64, 128, 256, 512, 1024, 2048, 4096, and 8192. The combination of value_A and value_B, (value_A, value_B), can be (8192, 4096), (8192, 2048), (8192, 1024), (8192, 512), (8192, 256), (8192, 128), (8192, 64), (8192, 32), (8192, 16), (8192, 8), (8192, 4), (4096, 2048), (4096, 1024), (4096, 512), (4096, 256), (4096, 128), (4096, 64), (4096, 32), (4096, 16), (4096, 8), (4096, 4), (2048, 1024), (2048, 512), (2048, 256), (2048, 128), (2048, 64), (2048, 32), (2048, 16), (2048, 8), (2048, 4), (1024, 512), (1024, 256), (1024, 128), (1024, 64), (1024, 32), (1024, 16), (1024, 8), (1024, 4), (512, 256), (512, 128), (512, 64), (512, 32), (512, 16), (512, 8), (512, 4), (256, 128), (256, 64), (256, 32), (256, 16), (256, 8), (256, 4), (128, 64), (128, 32), (128, 16), (128, 8), (128, 4), (64, 32), (64, 16), (64, 8), (64, 4), (32, 16), (32, 8), (32, 4), (16, 8), (16, 4), and (8, 4).

In the above constraints, the thresholds or conditions can be different when the neighboring CU is in a different region from the current block. The region can be CTU, CTU row, tile, slice, or an M×N block (where the N×M can be 64×64 or equal to the maximum TU size).

In one embodiment, if the neighboring block is bi-predicted and changed to be un-predicted for the OBMC of the current block, the weighting of the neighboring block samples can be multiplied by another predefined or derived weighting. For example, the weighting can be 0.5 or the weighting that is used in bi-prediction weighted sum of the neighboring.

In one embodiment, the OBMC is only applied when the reference pictures of the neighboring block and the current block are the same.

L-Shape Prediction Unit Partition

Figure 6A:
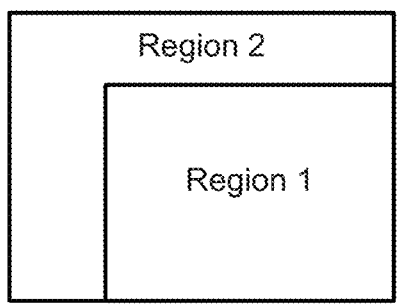
FIG. 6A illustrates an example of L-shape prediction unit partition, where region 1 corresponds to a rectangular region at lower-right corner of the CU and region 2 corresponds to the L-shaped region at upper-left corner of the CU.
Figure 6B:
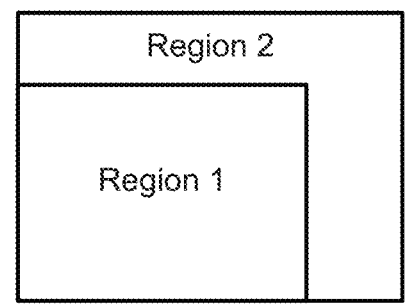
FIG. 6B illustrates an example of L-shape prediction unit partition, where region 1 corresponds to a rectangular region at lower-left corner of the CU and region 2 corresponds to the L-shaped region at upper-right corner of the CU
Figure 6C:
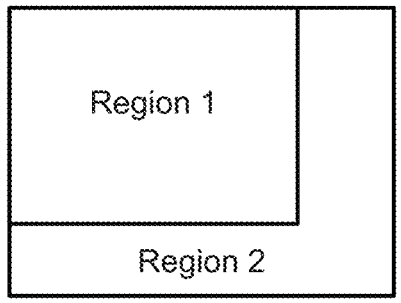
FIG. 6C illustrates an example of L-shape prediction unit partition, where region 1 corresponds to a rectangular region at upper-left corner of the CU and region 2 corresponds to the L-shaped region at lower-right corner of the CU.
Figure 6D:
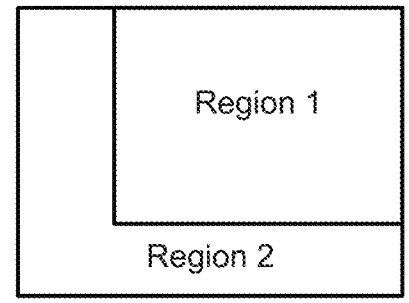
FIG. 6D illustrates an example of L-shape prediction unit partition, where region 1 corresponds to a rectangular region at upper-right corner of the CU and region 2 corresponds to the L-shaped region at lower-left corner of the CU.

According to this method, each coding unit (CU) is partitioned into two regions using L-shape pattern as shown in FIG. 6 A to FIG. 6D. In FIG. 6A, region 1 corresponds to a rectangular region at lower-right corner of the CU and region 2 corresponds to the L-shaped region at upper-left corner of the CU. In FIG. 6B, region 1 corresponds to a rectangular region at lower-left corner of the CU and region 2 corresponds to the L-shaped region at upper-right corner of the CU. In FIG. 6C, region 1 corresponds to a rectangular region at upper-left corner of the CU and region 2 corresponds to the L-shaped region at lower-right corner of the CU. In FIG. 6D, region 1 corresponds to a rectangular region at upper-right corner of the CU and region 2 corresponds to the L-shaped region at lower-left corner of the CU.

In one embodiment, one coding unit is split into two regions with size_region1 and size_region2. The predictors of the two regions are generated by different motion information, and a smoothing filter will be applied to the boundary of these two regions.

In another embodiment, two predictors with size equal to the current coding unit is generated by different motion information. The final predictor of the current coding unit is generated from the weighted sum of the two predictors.

The weights for predictor1 depend on the distance of the samples from the boundary of the two regions. The sample with a shorter the distance is assigned a smaller the weight. The weights for predictor 2 depend on the distance of the samples from the boundary of the two regions. The sample with a shorter the distance is assigned a smaller weight. For example, the weights (w1) of predictor 1 in region 1 can be determined according to the distance (d) between current sample and the boundary:

$$\begin{cases} w1 = 1, & \text{if } d > 4; \\ w1 = 0.75, & \text{if } 4 \geq d > 2; \\ w1 = 0.25, & \text{if } 2 \geq d \geq 0. \end{cases}$$

In region 2, the weights (w2) of predictor 1 can be determined according to the distance (d) between current sample and the boundary:

$$\begin{cases} w2 = 0, & \text{if } d > 4; \\ w2 = 0.125, & \text{if } 4 \geq d > 2; \\ w2 = 0.25, & \text{if } 2 \geq d \geq 0. \end{cases}$$

In one embodiment, the motion information of region 1 is signaled from encoder, while the motion information of region 2 can be derived from neighboring blocks. In another embodiment, the motion information in region 1 is the average motion of the neighboring blocks of the current block. For example, the motion vector is the average motion vector of neighboring blocks, and the reference picture is the one most used among neighboring blocks. In another embodiment the motion information in region 2 can be different among the sub-blocks. The motion information of each sub-block is equal to the sub-block above or the left block.

In one embodiment, the motion information of region 1 is signaled at the encoder side, and the motion information of region 2 is also signaled at the encoder side, but the Inter mode of region 2 is restricted to Merge mode.

L-shape prediction unit partition can be constrained according to the size, width and/or height. In one embodiment, if the size of current block is smaller than a predefined threshold, the current block cannot be applied with this mode, and the syntax, if there exists any, needs not to be signaled. For example, if the size of current block is smaller than 16, then current block will not apply multiple regions Inter prediction.

In one embodiment, the motion information of these two regions is constrained to be uni-prediction only. In another embodiment, only one of them is constrained to be uni-prediction.

When the motion information is constrained to be uni-prediction and the motion information is derived from neighboring CUs, the motion information of bi-prediction will be converted to uni-prediction only.

L-shape prediction unit partition can be switched in CU level. In one embodiment, a syntax is used to indicate whether the current block is further split into two regions. In another embodiment, this mode can be inferred according to the block size. If the blocks size is larger than a predefined threshold, than current block is inferred to be further split into two regions.

In another embodiment, OBMC is only applied if both current block and neighboring block are uni-prediction. In one example, the OBMC is only applied if both current block and neighboring block are uni-prediction, and the neighboring block is not in the upper CTU row.

In another embodiment, if current block is uni-prediction and the neighboring block is bi-prediction, then the OBMC blocks will be generated by using uni-prediction based on one of the motion information of the neighboring block. The motion information can be taken from either list 0, list 1, the one with a larger (or smaller) weight when generalized bi-prediction is applied for the neighboring block, the picture with smaller refIdx, the predictor from the closer picture (e.g. picture with smaller PoC (picture order count) difference with the current picture), the list same as current block's reference list if current block is uni-prediction, or the opposite list of current block, which is equal to (1−currentList), if current block is uni-prediction. In one example, if the refIdx's are the same in both lists or the pictures in both lists have the same distance with the current picture, the list 0 (or list 1) is selected. In another embodiment, the motion information can be taken from the list (of the neighboring block) with similar MV (or far-away MV in other embodiment) with the current block.

In another embodiment, if current block is bi-prediction, OBMC is only applied if the neighboring block is uni-prediction.

In another embodiment, if current block is bi-prediction, and the neighboring block is also bi-prediction, then the OBMC blocks will be generated by using uni-prediction based on one of the motion information of the neighboring block. The motion information can be taken from either list 0, list 1, the one with larger (or smaller) weight when generalized bi-prediction is applied for the neighboring block, the picture with smaller refIdx, or the predictor from the closer picture (e.g. picture with smaller PoC difference with the current picture), the list same as current block's reference list if current block is uni-prediction, or the opposite list of current block, which is equal to (1−currentList), if current block is uni-prediction. In one example, if the refIdx are the same in both lists or the pictures in both lists have the same distance with the current picture, the list 0 (or list 1) is selected. In another embodiment, the motion information can be taken from the list (of the neighboring block) with similar MV (or far-away MV in other embodiment) with the current block.

In another embodiment, if current block is bi-prediction, the predictor in OBMC region from current block is changed from bi-prediction to uni-prediction. The motion information can be taken from either list 0, list 1, the one with larger (or smaller) weight when generalized bi-prediction is applied for the neighboring block, the picture with smaller refIdx, or the predictor from the closer picture (e.g. picture with smaller PoC difference with the current picture), the list same as current block's reference list if current block is uni-prediction, or the opposite list of current block, which is equal to (1−currentList), if current block is uni-prediction. In one example, if the refIdx are the same in both lists or the pictures in both lists have the same distance with the current picture, the list 0 (or list 1) is selected. In another embodiment, the motion information can be taken from the list of the neighboring block with similar MV (or far-away MV in other embodiment) with the current block.

In another embodiment, if current block and neighboring block are bi-prediction, the final predictor in OBMC region are generated by one uni-prediction from current block and one uni-prediction from neighboring block. The motion information can be taken from either list 0, list 1, the one with larger (or smaller) weight when generalized bi-prediction is applied for the neighboring block, the picture with smaller refIdx, the predictor from the closer picture (e.g. picture with smaller PoC difference with the current picture), the list same as current block's reference list if current block is uni-prediction, or the opposite list of current block, which is equal to (1−currentList), if current block is uni-prediction. In one example, if the refIdx are the same in both lists or the pictures in both lists have the same distance with the current picture, the list 0 (or list 1) is selected. In another embodiment, the motion information can be taken from the list (of the neighboring block) with similar MV or far-away MV in other embodiment with the current block.

In another embodiment, if OBMC blocks are forced to use uni-prediction when neighboring blocks are bi-prediction, the motion information can be taken from either list 0, list 1, the one with larger weight when generalized bi-prediction is applied, the picture with smaller refIdx, the predictor from the closer picture (e.g. picture with smaller PoC difference with the current picture), the list same as current block's reference list if current block is uni-prediction, or the opposite list of current block, which is equal to (1−currentList), if current block is uni-prediction. In one example, if the refIdx are the same in both lists or the pictures in both lists have the same distance with the current picture, the list 0 (or list 1) is selected. In another embodiment, the motion information can be taken from the list (of the neighboring block) with similar MV (or far-away MV in other embodiment) with the current block.

In another embodiment, if OBMC blocks are forced to use uni-prediction when neighboring blocks are bi-prediction, the weight for OBMC blocks during the blending process will be reduced to ratio*(original weight). The ratio can be 0.25, 0.5, and 0.75.

The above mentioned constraints can be applied with size, area, width or height constraint on the current block and/or the neighboring block to further constrain or further relax the OBMC enabling condition(s).

In another embodiment, for the CU-boundary OBMC of the left-top sub-block, it will choose the left OBMC block only, or it will choose the top OBMC block only.

In another embodiment, for the CU-boundary OBMC of left-top sub-block, it will not perform MC for the original predictor nor combine the left OBMC block and top OBMC block into final result In another embodiment, for the CU-boundary OBMC of the left-top sub-block, it will choose the left OBMC block only, or it will choose the top OBMC block only. The choosing of left or top can depend on the current CU shape, or the similarity of the left/top MV with the current sub-block, the picture with smaller refIdx, or the predictor from the closer picture (e.g. picture with smaller PoC (Picture Order Count) difference with the current picture).

In another embodiment, for the CU-boundary OBMC of the left-top sub-block, it will generate partial lines from the top neighboring OBMC and partial lines from the left neighboring OBMC to combine with original predictor.

For the sub-block OBMC, the generation of original sub-block MC (e.g. ATMVP mode or affine mode) can be extended to a larger block (e.g. 6×6 or 8×8 compared to original 4×4) with the original MV. The extended MC block of each sub-block in the current CU can be further blended with each other to achieve the sub-block OBMC. The selection of the blending direction (e.g. top, left, bottom, right)) may vary according to different embodiments of the present invention. In one embodiment, each extended sub-block will blend with other sub-block in 4 direction (e.g. top, left, bottom, right). In another embodiment, each extended sub-block will blend with other sub-block in 8 direction (e.g. top, left, bottom, right and 4 corners). In another embodiment, each extended sub-block will blend with other sub-block in 2 direction (top, left). There are other embodiments of blending directions.

In order to reduce the bandwidth associated with sub-block OBMC, an embodiment of the present invention first checks to determine if the sub-block is uni-directional or bi-directional before generating each extended sub-block and then decides if to enable or disable the extended-region of sub-block. In one embodiment, if the sub-block is bi-directional, the extended region is disabled. In another embodiment, if one neighboring sub-block is bi-directional, the extended region for the overlapped part with the neighboring sub-block is disabled. In one embodiment, if the current sub-block is bi-directional and the neighboring sub-block is uni-directional coded, the L0 or L1 predictor of current sub-block is disabled. In another embodiment, it forces each sub-block to be uni-directional for original MC.

In another embodiment, in order to reduce the bandwidth for sub-block OBMC, an embodiment of the present invention first checks to determine if the sub-block is uni-directional or bi-directional and if the neighboring sub-block is uni-directional or bi-directional before generating each extended sub-block and then decide whether to disable partial or whole of extended-region.

In another embodiment, one constraint on CU when performing OBMC corresponds to the case that every sample will only have at most two motion compensation samples for either CU boundary or sub-CU boundaries OBMC. In order to meet this constraint, only one motion compensation sample is derived using one of the neighboring MVs and one motion compensation sample is derived using current MV. The final predictions is generated using bi-prediction for every sample in the CU.

In another embodiment, OBMC is only applied if current block is uni-prediction.

In another embodiment, OBMC is only applied if current block is uni-prediction. If neighboring block is bi-prediction, OBMC is reduced to uni-prediction. In another embodiment, OBMC is only applied if neighboring block is uni-prediction.

In another embodiment, OBMC is applied regardless of prediction direction of the current block. However, if neighboring block is bi-prediction, uni-prediction is used to generate OBMC blocks.

In one embodiment, when reducing bi-prediction to uni-prediction, list 0 is always chosen. In another embodiment, reference list 1 is always chosen. In another embodiment, when current block is uni-prediction, the same list as the current block is always chosen. In another embodiment, when current block is uni-prediction, the reference list different from that of the current block is always chosen. In another embodiment, when the current block is uni-prediction, the list with a larger (or smaller) reference picture difference compared to the reference list of the current block is chosen. In another embodiment, when the current block is uni-prediction and the reference picture distance in both lists are the same, the list with larger or smaller motion vector difference compared to the MV of the current block is chosen.

In one embodiment, if OBMC is applied when the current block is uni-prediction, the obmc flag needs not to be signaled if the current block is bi-prediction. In another embodiment, in Inter mode (AMVP mode), if OBMC is applied when the current block is uni-prediction (bi-prediction), the obmc flag needs not to be signaled if the current block is bi-prediction. In another example, the condition for uni-prediction and bi-prediction can be swapped. For example, if OBMC is applied when the current block is bi-prediction, the obmc flag needs not to be signaled if the current block is uni-prediction.

In another embodiment, the MV to generate OBMC block can be converted to integer MV. For luma component, the luma MV(s) is converted to integer MV, and then generate OBMC luma block. For chroma components, if the chroma MV(s) is not integer MV, OBMC chroma block will not be generated.

To make sure that the bandwidth and the number of samples requiring interpolation filtering will not exceed the worst case in an 8 by 4 bi-prediction block, OBMC is only applied if some predefined conditions are met according to one embodiment of the present invention.

In some cases, the height of a block is chosen to be power of 2 (e.g. 4, 8, 16, 32, 64, or 128). In one embodiment, when the current block is uni-prediction and the neighboring block is uni-prediction, if the height of the current block is equal to 4, OBMC is skipped; if the height of the current block is equal to 8, OBMC is only applied if the width (i.e., the width of the current block) is larger than 8; and if the height of the current block is larger than 8, OBMC is only applied if width is larger than 4. The fixed values (i.e., 4 and 8) here are examples of the threshold setting. The values can be replaced by other integers.

In one embodiment, when the current block is bi-prediction and the neighboring block is uni-prediction, if the height of the current block is equal to 4, OBMC is skipped; if the height of the current block is equal to 8, OBMC is only applied if the width is larger than 32; if the height of the current block is equal to 16, OBMC is only applied if width is larger than 8; and if the height of the current block is larger than 16, OBMC is only applied if width is larger than 4. The fixed values (i.e., 4, 8, 16, and 32) are examples of the threshold setting. The values can be replaced by other integers.

In one embodiment, when the current block is uni-prediction and the neighboring block is bi-prediction, if the height of the current block is equal to 4, OBMC is skipped; if current block's height is equal to 8, OBMC is only applied if the width is larger than 32; if the height of the current block is larger than 8 and less than 64 (i.e., height equal to 16 or 32), OBMC is only applied if the width is larger than 8; and if the height of the current block is larger than 32 (i.e., height equal to 64 or 128), OBMC is only applied if width is larger than 4. The fixed values here (i.e., 4, 8, 32, and 64) are examples of the threshold setting. The values can be replaced by other integers.

In one embodiment, when the current block is uni-prediction and the neighboring block is bi-prediction, if the height of the current block is equal to 4, OBMC is skipped; if the height of the current block is equal to 8, OBMC is only applied if the width is larger than 8 and OBMC block will be reduced from bi-prediction to uni-prediction if the width is equal to 16 or 32; if the height of the current block is larger than 8 and less than 64 (i.e., height equal to 16 or 32), OBMC is only applied if the width is larger than 4, and OBMC block will be reduced from bi-prediction to uni-prediction if the width is equal to 8; and if the height of the current block is larger than 32 (i.e., height equal to 64 or 128), OBMC is only applied if width is larger than 4. The fixed values here (i.e., 4, 8, 16, 32 and 64) are examples of the threshold setting. The values can be replaced by other integers.

In one embodiment, when the current block is bi-prediction and the neighboring block is bi-prediction, if the height of the current block is less than 16, OBMC is skipped; if the height of the current block is equal to 16, OBMC is only applied if the width is larger than 16; and if the height of the current block is larger than 16, OBMC is only applied if width is larger than 8. The fixed values here (i.e., 8 and 16) are examples of the threshold setting. The values can be replaced by other integers.

In one embodiment, when the current block is bi-prediction and the neighboring block is bi-prediction, if the height of the current block is equal to 4, OBMC is skipped; if the height of the current block is equal to 8, OBMC is only applied if the width is equal to 64 or 128, and OBMC block will be reduced from bi-prediction to uni-prediction; if the height of the current block is equal to 16, OBMC is only applied if the width is larger than 8, and if the width is equal to 16, OBMC block will be reduced from bi-prediction to uni-prediction; and if the height of the current block is larger than 16, OBMC is only applied if width is larger than 4, and if the width is equal to 8, OBMC block will be reduced from bi-prediction to uni-prediction. The fixed values here (i.e., 4, 8, 16, 64 and 128) are examples of the threshold setting. The values can be replaced by other integers.

In another embodiment, regardless of prediction direction (i.e., uni- or bi-prediction) of the current block and neighboring block, if the height of the current block is less than 16, OBMC is skipped; if the height of the current block is equal to 16, OBMC is only applied if the width is larger than 16; and if the height of the current block is larger than 16, OBMC is only applied if the width is larger than 8. The fixed values here (i.e., 8 and 16) are examples of the threshold setting. The values can be replaced by other integers.

In one embodiment, regardless of the prediction direction (uni- or bi-prediction) of the current block and neighboring block, if the height of the current block is equal to 4, OBMC is skipped; if the height of the current block is equal to 8, OBMC is only applied if the width of current block is equal to 64 or 128, and OBMC block will be reduced from bi-prediction to uni-prediction (if the current block being predicted by bi-prediction); if the height of the current block is equal to 16, OBMC is only applied if the width is larger than 8, and if current block's width is equal to 16, OBMC block will be reduced from bi-prediction to uni-prediction (if the current block being predicted by bi-prediction); and if the height of the current block is larger than 16, OBMC is only applied if width is larger than 4, and if current block's width is equal to 8, OBMC block will be reduced from bi-prediction to uni-prediction (if the current block being predicted by bi-prediction). The fixed values here are examples of the threshold setting. The values can be replaced by other integers.

In one embodiment, when the current block is coded in uni-prediction, if the height of the current block is equal to 4, OBMC is skipped; if the height of the current block is equal to 8, OBMC is only applied if the width is larger than 32; if the height of the current block is larger than 8 and less than 64, OBMC is only applied if the width is larger than 8; and if the height of the current block is larger than 32, OBMC is only applied if the width is larger than 4. The fixed values here are examples of the threshold setting. The values can be replaced by other integers.

In one embodiment, when the current block is coded in uni-prediction, if the height of the current block is equal to 4, OBMC is skipped; if the height of the current block is equal to 8, OBMC is only applied if the width is larger than 8, and if the width is equal to 16 or 32, OBMC block will be reduced from bi-prediction to uni-prediction (if the current block being predicted by bi-prediction); if the height of the current block is larger than 8 and less than 64, OBMC is only applied if the width is larger than 4, and if the width is equal to 8, OBMC block will be reduced from bi-prediction to uni-prediction (if the current block being predicted by bi-prediction); and if the height of the current blocks is larger than 32, OBMC is only applied if the width is larger than 4. The fixed values here are examples of the threshold setting. The values can be replaced by other integers.

In one embodiment, when the current block is coded in bi-prediction, if the height of the current block is less than 16, OBMC is skipped; if the height of the current block is equal to 16, OBMC is only applied if the width is larger than 16; and if the height of the current block is larger than 16, OBMC is only applied if the width is larger than 8. The fixed values here are examples of the threshold setting. The values can be replaced by other integers.

In one embodiment, when the current block is coded in bi-prediction, if the height of the current block is equal to 4, OBMC is skipped; if the height of the current block is equal to 8, OBMC is only applied if the width is equal to 64 or 128, and OBMC block will be reduced from bi-prediction to uni-prediction (if the current block being predicted by bi-prediction); if the height of the current block is equal to 16, OBMC is only applied if the width is larger than 8, and if the width is equal to 16, OBMC block will be reduced from bi-prediction to uni-prediction (if the current block being predicted by bi-prediction); and if the height of the current block is larger than 16, OBMC is only applied if the width is larger than 4, and if the width is equal to 8, OBMC block will be reduced from bi-prediction to uni-prediction (if the current block being predicted by bi-prediction). The fixed values here are examples of the threshold setting. The values can be replaced by other integers.

In one embodiment, when the neighboring block is coded in uni-prediction, if the height of the current block is equal to 4, OBMC is skipped; if the height of the current block is equal to 8, OBMC is only applied if the width is larger than 32; if current block's height is equal to 16, OBMC is only applied if width is larger than 8; and if the height of the current block is larger than 16, OBMC is only applied if the width is larger than 4. The fixed values here are examples of the threshold setting. The values can be replaced by other integers.

In one embodiment, when the neighboring block is coded in bi-prediction, if the height of the current block is less than 16, OBMC is skipped; if the height of the current block is equal to 16, OBMC is only applied if the width is larger than 16; and if the height of the current block is larger than 16, OBMC is only applied if width is larger than 8. The fixed values here are examples of the threshold setting. The values can be replaced by other integers.

In one embodiment, when the neighboring block is coded in bi-prediction, if the height of the current block is equal to 4, OBMC is skipped; if the height of the current block is equal to 8, OBMC is only applied if the width is equal to 64 or 128, and OBMC block will be reduced from bi-prediction to uni-prediction; if the height of the current block is equal to 16, OBMC is only applied if the width is larger than 8, and if the height of the current block is equal to 16, OBMC block will be reduced from bi-prediction to uni-prediction; and if the height of the current block is larger than 16, OBMC is only applied if the width is larger than 4, and if the width is equal to 8, OBMC block will be reduced from bi-prediction to uni-prediction. The fixed values here are examples of the threshold setting. The values can be replaced by other integers.

In another embodiment, when the neighboring block is coded in uni-prediction, OBMC is skipped if the MV(s) for OBMC comes from a block with width and height equal to 4. The fixed value here is an example of the threshold setting. The values can be replaced by other integers.

In another embodiment, when the neighboring block is coded in bi-prediction, if the height of the current block is equal to 4, OBMC is skipped; if the height of the current block is equal to 8, OBMC is only applied if the width is larger than 16; if current block's height is equal to 16, OBMC is only applied if the width is larger than 8; and if the height of the current block is larger than 16, OBMC is only applied if width is larger than 4. The fixed values here are examples of the threshold setting. The values can be replaced by other integers.

In one embodiment, when the neighboring block is coded in bi-prediction, if the height of the current block is equal to 4, OBMC is skipped; if the height of the current block is equal to 8, OBMC is only applied if the width is larger than 8, and if the width is equal to 16, OBMC block will be reduced from bi-prediction to uni-prediction; if the height of the current block is equal to 16, OBMC is only applied if the width is larger than 2, and if the width is equal to 4 or 8, OBMC block will be reduced from bi-prediction to uni-prediction; and if the height of the current block is larger than 16, OBMC is only applied if the width is larger than 2, and if the width is equal to 4, OBMC block will be reduced from bi-prediction to uni-prediction. The fixed values here are examples of the threshold setting. The values can be replaced by other integers.

In another embodiment, regardless of the prediction direction (uni- or bi-prediction) of the current block and neighboring block, if the height of the current block is equal to 4, OBMC is skipped; if the height of the current block is equal to 8, OBMC is only applied if the width is larger than 16; if the height of the current block is equal to 16, OBMC is only applied if the width is larger than 8; and if the height of the current block is larger than 16, OBMC is only applied if the width is larger than 4. The fixed values here are examples of the threshold setting. The values can be replaced by other integers.

In one embodiment, regardless of the prediction direction (uni- or bi-prediction) of the current block and neighboring block, if the height of the current block is equal to 4, OBMC is skipped; if the height of the current block is equal to 8, OBMC is only applied if the width is larger than 8, and if the width is equal to 16, OBMC block will be reduced from bi-prediction to uni-prediction (if the current block being predicted by bi-prediction); if the height of the current block is equal to 16, OBMC is only applied if the width is larger than 2, and if the width is equal to 4 or 8, OBMC block will be reduced from bi-prediction to uni-prediction (if the current block being predicted by bi-prediction); and if the height of the current block is larger than 16, OBMC is only applied if the width is larger than 2, and if the height of the current block is equal to 4, OBMC block will be reduced from bi-prediction to uni-prediction (if the current block being predicted by bi-prediction). The fixed values here are examples of the threshold setting. The values can be replaced by other integers.

Besides BIO and ATMVP, there are many other Inter coding tools, such as DMVR (Decoder MV Refinement), GBi (Generalized bi-prediction), NPO (Neighboring-derived Prediction Offset), MMVD (Merge with MVD), LIC (Local Illumination Compensation), AMVR (Advanced Motion Vector Resolution), Unified Merge List, STMVP (Spatial-Temporal Motion Vector Prediction), Triangular Merge Mode, and Multi-Hypothesis Mode, that have been developed in recent years to improve coding performance. Often, these new Inter coding tools cause additional data access and additional computations. Therefore, these Inter coding tools result in system bandwidth increase as well as computational complexity increase.

Unified Merge List. In modern codec technique, there are many candidates in Merge/Skip mode extra than HEVC. For example, in document JVET-J0018 ("Description of SDR video coding technology proposal by MediaTek", Joint Video Experts Team (WET) of ITU-T SG 16 WP 3 and ISO/IEC JTC 1/SC 29/WG 11, 10th Meeting: San Diego, US, 10-20 Apr. 2018), there are many types of Merge candidates in Merge list, such as affine-inherited, affine-corner, spatial, temporal, middle-spatial, and so on.

DMVR. Bilateral Template MV Refinement (BTMVR) is also referred as Decoder-side MV refinement (DMVR) in some literature. In JVET-D0029 (Xu Chen, et al., "Decoder-Side Motion Vector Refinement Based on Bilateral Template Matching", Joint Video Exploration Team (WET) of ITU-T SG 16 WP 3 and ISO/IEC JTC 1/SC 29/WG 11, 4th Meeting: Chengdu, CN, 15-21 Oct. 2016, Document: WET-D0029), Decoder-Side Motion Vector Refinement (DMVR) based on bilateral template matching is disclosed. For the BTMVR process, initial motion vectors for a current block are determined. The BTMVR process is applied to a bi-predicted block. A template is generated by using the bi-prediction from two reference blocks pointed by the two initial motion vectors respectively. In the next step, it uses the bilateral template to do integer ME (Motion Estimation) and fractional ME searching around L0 Reference Block in L0 Reference Picture with a search range of P pixel×Q pixel, and finds the location of minimum ME cost. The final location of minimum ME cost is assigned to a refined MV of L0. Similar step is applied to locate a refines MV of L1. For example, using the template as a new current block and perform the motion estimation to find a better matching block in L0 reference picture and L1 reference picture, respectively. The refined MVs are used to generate a final bi-predicted prediction block for the current block.

GBi. Generalized bi-prediction is proposed in JVET-00047 (C. Chen, et al., "Generalized bi-prediction for inter coding", in Joint Video Exploration Team (JVET) of ITU-T SG 16 WP 3 and ISO/IEC JTC 1/SC 29/WG 11, 3rd Meeting: Geneva, CH, 26 May-1 Jun. 2016, Document: JVET-00047). The concept of GBi is to allow the use different weights for predictors from L0 and L1, respectively, instead of using equal weights in traditional bi-prediction. Furthermore, in JVET-D0102 (C. Chen, et al., "*EE3: Generalized bi-prediction*", in Joint Video Exploration Team (JVET) of ITU-T SG 16 WP 3 and ISO/IEC JTC 1/SC 29/WG 11, 4th Meeting: Chengdu, CN, 15-21 Oct. 2016, Document: JVET-D0102), the weights table and associated syntax and codewords for selecting a particular weight pair are disclosed.

STMVP. In JEM-3.0 (Chen et al., "*Algorithm Description of Joint Exploration Test Model* 3", Joint Video Exploration Team (JVET) of ITU-T SG 16 WP 3 and ISO/IEC JTC 1/SC 29/WG 11, 3rd Meeting: Geneva, CH, 26 May-1 Jun. 2016, Document: JVET-C1001), a spatial-temporal motion vector prediction (STMVP) is also included in Merge mode coding. In STMVP, the motion vectors of the sub-CUs are derived recursively following the raster scan order by using the temporal motion vector predictor and spatial neighbouring motion vector.

NPO. Neighboring-derived Prediction Offset (NPO) is a method used to add prediction offset to improve the motion compensated predictors. With this offset, the different lighting conditions between frames can be considered. The offset is derived using neighboring reconstructed pixels (NRP) and extended motion compensated predictors (EMCP).

The patterns chosen for NRP and EMCP are N pixels left and M pixels above to the current PU, where N and M is a predetermined value. The patterns can be of any size and shape and can be decided according to any encoding parameters, such as PU or CU sizes, as long as they are the same for both NRP an EMCP. Then the offset is calculated as the average pixel value of NRP minus the average pixel value of EMCP. This derived offset will be unique over the PU and applied to the whole PU along with the motion compensated predictors.

When all individual offsets are calculated and obtained, the derived offset for each position in the current PU will be the average of the offsets from the left and above positions. So for the first position in the top left corner in this example, offset of 6 will be generated by averaging the offset from left and above. For the next position, the offset will be equal to (6+4)/2, that is, 5. The offset for each position can be processed and generated in raster scan order sequentially. Since the neighboring pixels are more highly correlated to the boundary pixels, so do the offsets. This method can adapt the offset according to the pixel positions. The derived offsets will be adapted over the PU and applied to each PU position individually along with the motion compensated predictors.

AMVR. Advanced Motion Vector Resolution (AMVR) mode is used in video codec for improving coding gain. The AMVR can adaptively switch the resolution of Motion Vector Difference (MVD). The Motion Vector Difference (MVD) (between the final MV and the MV predictor of a PU) can be coded with either quarter-pel resolution or integer-pel resolution. The switching is controlled at coding unit (CU) level and an integer MVD resolution flag is (conditionally) signaled.

MMVD. MMVD (Merge with MVD) Merge candidate is a technique developed under an emerging video coding standard called VVC (Versatile Video Coding). MMVD Merge candidate is also called UMVE (Ultimate Motion Vector Expression) Merge candidate. In JVET-K0115 (S. Jeong, et al., "CE4 *Ultimate motion vector expression in J0024 (Test 4.2.9)*", in Joint Video Exploration Team (JVET) of ITU-T SG 16 WP 3 and ISO/IEC JTC 1/SC 29/WG 11, 11th Meeting: Ljubljana, SI, 10-18 Jul. 2018, Document: JVET-K0115), ultimate motion vector expression (UMVE) proposed in JVET-J0024 (S. Akula, et. Al., "*Description of SDR, HDR and 360° video coding technology proposal considering mobile application scenario by Samsung, Huawei, GoPro, and HiSilicon*", in Joint Video Exploration Team (JVET) of ITU-T SG 16 WP 3 and ISO/IEC JTC 1/SC 29/WG 11, 10th Meeting: San Diego, US, 10-20 Apr. 2018, Document: JVET-J0024) is presented. A reference frame in reference list L1 and a reference frame in reference list L1 correspond to the two reference for bi-prediction. A line through the center of the current block goes through two corresponding pixels in the two reference frames. The search is performed around the center points associated with the line. In order to simplify the search process, only specific locations around the center point vertically and horizontally will be searched for L0 reference and L1 reference. UMVE is used for either Skip or Merge modes with a proposed motion vector expression method. UMVE re-uses the same Merge candidate as VVC. Among the Merge candidates, a candidate can be selected, and is further expanded by the proposed motion vector expression method. UMVE provides a new motion vector expression with simplified signaling. The expression method includes prediction direction information, starting point, motion magnitude, and motion direction.

LIC. Local Illumination Compensation (LIC) is a method to perform Inter prediction using neighboring samples of the current block and a reference block. It is based on a linear model using a scaling factor a and an offset b. The method derives the scaling factor a and the offset b by referring to the neighbor samples of the current block and the reference block. The neighboring samples of the current block and the reference block correspond to an L-shaped including neighboring pixels above and neighboring pixels on the left of the current block and the reference block. After the scaling factor a and the offset b are derived, the LIC processed pixel l(x,y) is derived according to l(x,y)=a*r(x,y)+b, where r(x,y) corresponds to the motion-compensated reference data. Moreover, the LIC process can be enabled or disabled adaptively for each CU.

More details regarding LIC can be found in JVET-C1001 ((Xu Chen, et al., "Algorithm Description of Joint Exploration Test Model 3", Joint Video Exploration Team (JVET) of ITU-T SG 16 WP 3 and ISO/IEC JTC 1/SC 29/WG 11, 3rd Meeting: Geneva, CH, 26 May-1 Jun. 2016, Document: JVET-C1001).

Triangular Merge Mode. In the triangular prediction unit mode, a CU can be split using two triangular prediction units, in either diagonal or inverse diagonal direction. Each triangular prediction unit in the CU has its own uni-prediction motion vector and reference frame index which are derived from a uni-prediction candidate list. Triangular partitioning is only applied to motion compensated prediction, which means that the transform and quantization process is applied to the whole CU formed by combining two triangles together. In this contribution, the triangular prediction unit mode is only applied to a CU which block size is larger than or equal to 8×8, and its coding prediction mode is either skip or merge mode.

Multi-hypothesis mode. The multi-hypothesis mode is a new Inter prediction tool disclosed in JVET-L0100 (M.-S. Chiang, et al., "*CE10.1.1: Multi-hypothesis prediction for improving AMVP mode, skip or merge mode, and intra mode*", Joint Video Experts Team (JVET) of ITU-T SG 16 WP 3 and ISO/IEC JTC 1/SC 29/WG 11, 12th Meeting: Macao, CN, 3-12 Oct. 2018, Document: JVET-L0100). The multi-hypothesis mode uses N Merge candidate, N AMVP candidate or "N Inter candidate+N Intra candidate" to do average and form the final predictor. For example, the multi-hypothesis mode uses 1 Merge candidate, 1 AMVP candidate or "1 Inter candidate+1 Intra candidate" to do average and form the final predictor.

In another aspect of the present invention, OBMC is excluded for some Inter modes. For example, if the current inter-mode is BIO mode, then the OBMC is turned off implicitly. For example, if the current Inter mode is DMVR mode, then the OBMC is turned off implicitly. For example, if the current inter-mode is GBi mode, then the OBMC is turned off implicitly. For example, if the current inter-mode is multi-hypothesis mode, then the OBMC is turned off implicitly. For example, if the current inter-mode is triangular merge mode, then the OBMC is turned off implicitly.

In one embodiment, the exclusion rule for OBMC can depend on the current Inter mode as well as the uni-prediction or bi-prediction of the Inter mode.

In one embodiment, the exclusion rule for OBMC can depend on the current Inter mode as well as the current CU size.

In one embodiment, the exclusion rule for OBMC can depend on the current Inter mode as well as the current CU width or CU height.

In one embodiment, the exclusion rule for OBMC can depend on the current Inter mode as well as the MV diversity of the current inter mode.

In embodiments of the present invention, when the OBMC is used, all other Inter modes (e.g. BIO, GBI, DMVR, Affine mode and so on) for the extended-region for OBMC are not used. The extended region for OBMC corresponds to the region of the current CU requiring the MV from a neighboring CU. In other words, the extended region corresponds to the region of extended result from neighboring MV. It is proposed to exclude (i.e., to disable) all other Inter modes and only to use conventional MC filtering for generating the extended-region for OBMC.

An override behavior of the syntax design is proposed. The override behavior of the OBMC is to add some override syntax in the low level of video segment so that the syntax value at a low level of the video segment can override the high level video setting value of the OBMC. For example, an "enable" flag of the OBMC in the slice level can be signaled. The slice-level OBMC enable flag can override the high level (e.g. picture level setting of "enable" flag of the OBMC) value. For the low level syntax or high level syntax, it may have a value 1 for the enable flag. If the override enable flag is 1, then the override value can be sent in syntax. If the override enable flag is 0, then the OBMC setting is from higher level setting. The override unit can be the picture level, slice level, tile level, tile group level, CU level or PU level.

Various override behavior examples are shown as follows. In example 1, it has the total control of the OBMC on SPS (sequence parameter set) syntax. In other words, one flag indicating OBMC on/off can be in SPS. If the flag is OFF, the OBMC will be turned off for every picture in the sequence. However, if this flag is ON, each picture can turn on OBMC according to a flag in PPS to indicate OBMC on/off. In other words, the PPS flag can override the flag in SPS.

In example 2, it has the total control of the shared mode in SPS syntax. However, it can have an "override enable flag" in PPS. If it is 1, each Slice can has one "slice override enable flag". If "slice override enable flag" is 1, each slice can have a syntax to enable OBMC for the slice. If override is not enabled, then the slice has no syntax to enable OBMC for the slice. In this case, the slice uses the values from SPS.

In one embodiment, when GBi mode is enabled, OBMC can be combined with GBI mode. In one example, the OBMC blocks are generated using the GBi index inherited from neighboring reference blocks. In another example, the OBMC blocks are generated using equal weight bi-prediction.

In one embodiment, when CPR mode is enabled, OBMC can be combined with CPR mode. In one example, if CPR mode is applied in the current block, OBMC is implicitly disabled. In another example, if CPR mode is applied in the current block, a flag is used to indicate whether OBMC is applied in the current block.

In one embodiment, when triangle mode is applied, OBMC can be combined with triangle mode. In another embodiment, if triangle mode is applied in the current block, OBMC is implicitly disabled.

To reduce the additional bandwidth and interpolation operations, it is proposed to apply OBMC only if both the current block and neighboring block are uni-prediction. In one example, the OBMC is only applied if both the current block and neighboring block are uni-prediction, and the neighboring block is not in the upper CTU row.

In another embodiment, if current block is uni-prediction and the neighboring block is bi-prediction, then the OBMC blocks will be generated by using uni-prediction by using one of the motion information of the neighboring block. The motion information can be taken from either list 0, list 1, the one with larger (or smaller) weight when generalized bi-prediction is applied for the neighboring block, the picture with smaller refIdx, or the predictor from the closer picture (e.g. picture with smaller PoC difference with the current picture). In one example, if the refIdx are the same in both lists or the pictures in both lists have the same distance with the current picture, the list 0 (or list 1) is selected. In another embodiment, the motion information can be taken from the list of the neighboring block with similar MV (or far-away MV in other embodiment) as the current block. In another embodiment, the list whose reference picture has larger distance to current frame is taken. In another embodiment, the list with a reference picture having smaller distance to current frame is selected. In one embodiment, if the picture distance in both lists are the same, choose list0. In another embodiment, if the picture distance in both lists are the same, list1 is selected. In another embodiment, when the current block is uni-prediction, the list with a reference picture the same as the current block is selected. If the reference picture in both lists are not the same as the current block, a default list is selected. The default list can be list 0 or list 1.

In one embodiment, if OBMC is only applied when current block is uni-prediction, and the current block is coded in triangle mode, then OBMC is implicitly disabled since the complexity of triangle mode is similar to bi-prediction block.

Any of the foregoing proposed methods can be implemented in encoders and/or decoders. For example, any of the proposed methods can be implemented in predictor derivation module of an encoder, and/or a predictor derivation module of a decoder. Alternatively, any of the proposed methods can be implemented as a circuit coupled to the predictor derivation module of the encoder and/or the predictor derivation module of the decoder, so as to provide the information needed by the predictor derivation module.

Figure 7:
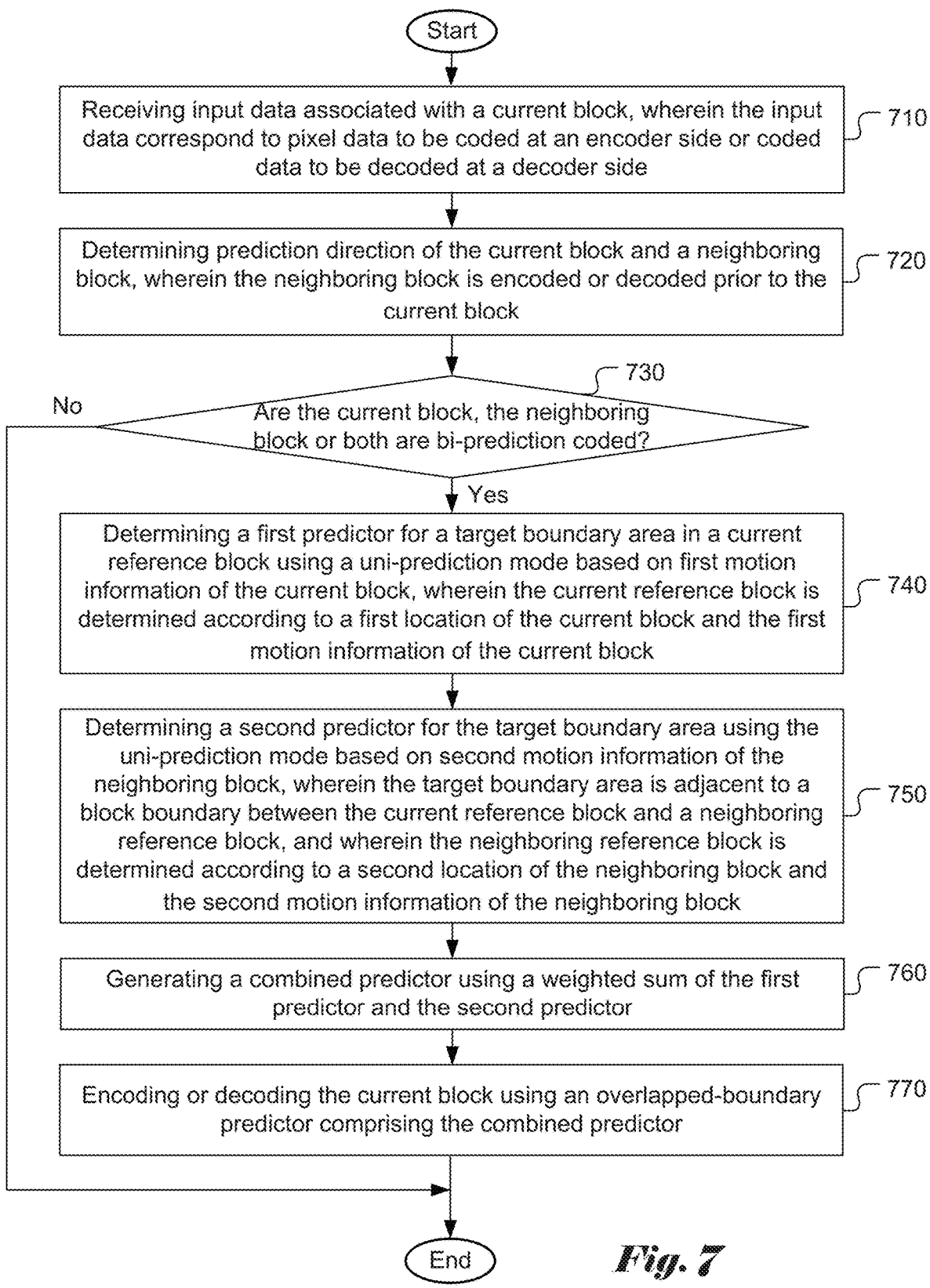
FIG. 7 illustrates an exemplary flowchart of a video coding system using OBMC (Overlapped Block Motion Compensation) according to an embodiment of the present invention.

FIG. 7 illustrates an exemplary flowchart of a video coding system using OBMC (Overlapped Block Motion Compensation) according to an embodiment of the present invention. The steps shown in the flowchart, as well as other flowcharts in this disclosure, may be implemented as program codes executable on one or more processors (e.g., one or more CPUs) at the encoder side and/or the decoder side. The steps shown in the flowchart may also be implemented based on hardware such as one or more electronic devices or processors arranged to perform the steps in the flowchart. According to this method, input data associated with a current block are received in step 710, wherein the input data correspond to pixel data to be coded at an encoder side or coded data to be decoded at a decoder side. Prediction directions of the current block and a neighboring block are determined in step 720, wherein the neighboring block is encoded or decoded prior to the current block. Whether the current block, the neighboring block or both are bi-prediction coded is checked in step 730. If the current block, the neighboring block or both are bi-prediction coded (i.e., the "yes" path from step 730), steps 740 to 770 are performed. Otherwise (the "no" path from step 730), steps 740 to 770 are skipped. In step 740, a first predictor for a target boundary area in a current reference block is determined using a uni-prediction mode based on first motion information of the current block, wherein the current reference block is determined according to a first location of the current block and the first motion information of the current block. In step 750, a second predictor for the target boundary area is determined using the uni-prediction mode based on second motion information of the neighboring block, wherein the target boundary area is adjacent to a block boundary between the current reference block and a neighboring reference block, and wherein the neighboring reference block is determined according to a second location of the neighboring block and the second motion information of the neighboring block. In step 760, a combined predictor is generated using a weighted sum of the first predictor and the second predictor. In step 770, the current block is encoded or decoded using an overlapped-boundary predictor comprising the combined predictor.

Figure 8:
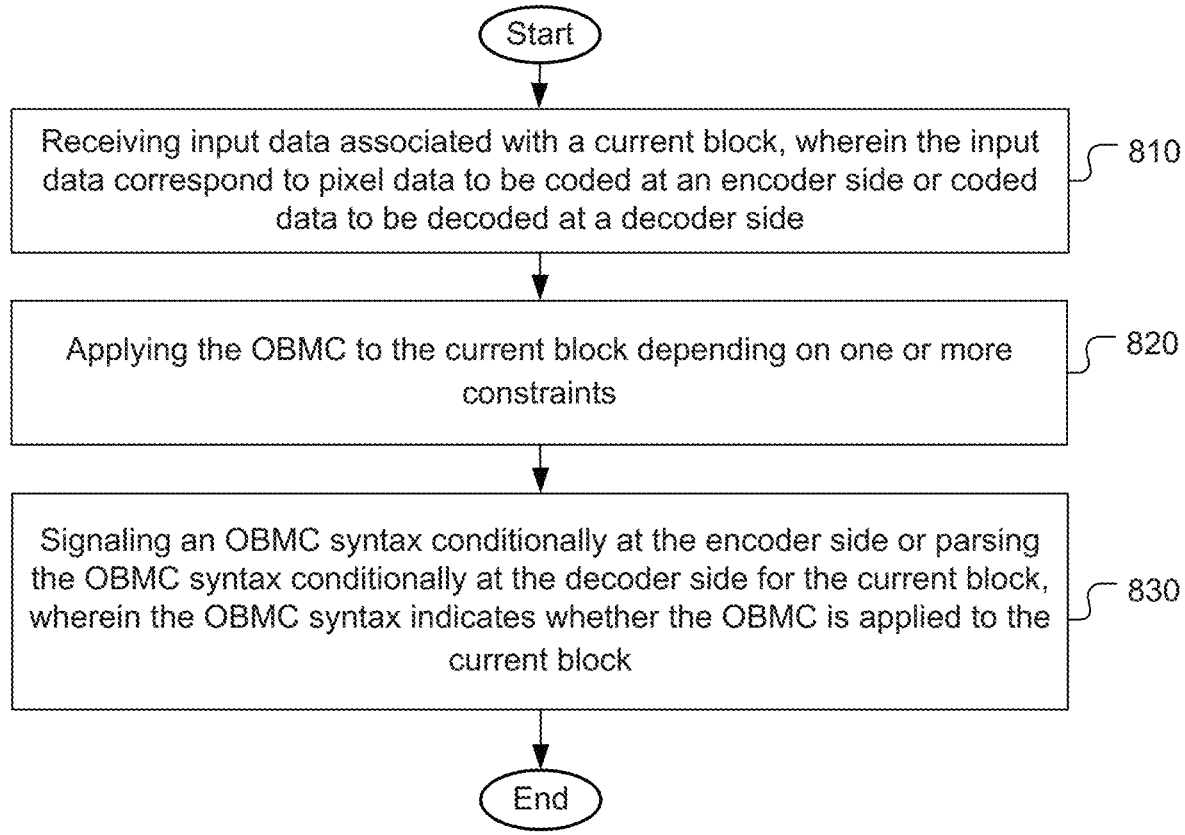
FIG. 8 illustrates another exemplary flowchart of a video coding system using OBMC (Overlapped Block Motion Compensation) according to an embodiment of the present invention.

FIG. 8 illustrates another exemplary flowchart of a video coding system using OBMC (Overlapped Block Motion Compensation) according to an embodiment of the present invention. According to this method, input data associated with a current block are received in step 810, wherein the input data correspond to pixel data to be coded at an encoder side or coded data to be decoded at a decoder side. The OBMC is applied to the current block depending on one or more constraints in step 820. An OBMC syntax is signaled conditionally at the encoder side or the OBMC syntax is parsed conditionally at the decoder side for the current block, wherein the OBMC syntax indicates whether the OBMC is applied to the current block in step 830.

The flowcharts shown above are intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

A non-transitory computer readable medium storing program instructions causing a processing circuit of an apparatus to perform the above video coding method is also disclosed.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video coding using OBMC (Overlapped Block Motion Compensation), the method comprising:
    receiving input data associated with a current block, wherein the input data correspond to pixel data to be coded at an encoder side or coded data to be decoded at a decoder side;
    determining whether to apply the OBMC to the current block depending on one or more constraints, wherein said one or more constraints correspond to whether the block width, block height, or block size of a target block is smaller than or equal to a threshold or is greater than or equal to a threshold, wherein the threshold is selected from any one of a block size of 16, 32, 64, 128, or 256, or any one of a width or height of 4, 8, 16, 32, or 64; and
    signaling an OBMC syntax conditionally at the encoder side or parsing the OBMC syntax conditionally at the decoder side for the current block based on the determination, wherein the OBMC syntax indicates whether the OBMC is applied to the current block, wherein when the current block is smaller than the threshold, the OBMC is disabled and the OBMC syntax is not signaled.

2. The method of claim 1, wherein the current block corresponds to a coding unit (CU) and the OBMC syntax is a CU-level syntax.

3. The method of claim 1, wherein said one or more constraints correspond to whether a target block is uni-prediction coded or not, and the OBMC syntax is not signaled for the current block if the target block is bi-prediction coded.

4. The method of claim 1, wherein said one or more constraints correspond to whether one or more motion vector of a target block is integer motion vector or not.

5. The method of claim 3, wherein the target block is the current block or is one of the neighboring blocks.

6. The method of claim 1, wherein the target block is the current block or is one of the neighboring blocks.

7. The method of claim 4, wherein the target block is the current block or is one of the neighboring blocks.

8. The method of claim 1, wherein said one or more constraints correspond to the OBMC being applied to a target block for Inter mode when the target block is uni-prediction coded, and the OBMC syntax is not signaled for the current block if the current block is bi-prediction coded.

9. An apparatus of video coding using OBMC (Overlapped Block Motion Compensation), the apparatus of video coding comprising one or more electronic circuits or processors arranged to:
    receive input data associated with a current block, wherein the input data correspond to pixel data to be coded at an encoder side or coded data to be decoded at a decoder side;
    determine whether to apply the OBMC to the current block depending on one or more constraints, wherein said one or more constraints correspond to whether the block width, block height, or block size of a target block is smaller than or equal to a threshold or is greater than or equal to a threshold, wherein the threshold is selected from any one of a block size of 16, 32, 64, 128, or 256, or any one of a width or height of 4, 8, 16, 32, or 64; and
    signal an OBMC syntax conditionally at the encoder side or parse the OBMC syntax conditionally at the decoder side for the current block based on the determination, wherein the OBMC syntax indicates whether the OBMC is applied to the current block, wherein when the current block is smaller than the threshold, the OBMC is disabled and the OBMC syntax is not signaled.

10. The apparatus of claim 9, wherein the current block corresponds to a coding unit (CU) and the OBMC syntax is a CU-level syntax.

11. The apparatus of claim 9, wherein said one or more constraints correspond to whether a target block is uni-prediction coded or not, and the OBMC syntax is not signaled for the current block if the target block is bi-prediction coded.

12. The apparatus of claim 11, wherein the target block is the current block or is one of the neighboring blocks.

13. The apparatus of claim 9, wherein the target block is the current block or is one of the neighboring blocks.

14. The apparatus of claim 9, wherein said one or more constraints correspond to whether one or more motion vector of a target block is integer motion vector or not.

15. The apparatus of claim 14, wherein the target block is the current block or is one of the neighboring blocks.

16. The apparatus of claim 9, wherein said one or more constraints correspond to the OBMC being applied to a target block for Inter mode when the target block is uni-prediction coded, and the OBMC syntax is not signaled for the current block if the current block is bi-prediction coded.

17. The method of claim 1, wherein signaling an OBMC syntax conditionally is based on signaling a high-level first OBMC-related syntax.

18. The apparatus of claim 9, wherein the one or more electronic circuits or processors are further arranged to signal an OBMC syntax conditionally based on signaling a high-level first OBMC-related syntax.

* * * * *